3,021,538
THREAD CUTTING TOOL WITH DULLED EDGES ON THE GUIDE TEETH PORTION
Francis M. Linley, Jr., Easton, Conn., assignor to Universal Thread Grinding Company, Bridgeport, Conn., a partnership
Filed Apr. 16, 1956, Ser. No. 578,439
3 Claims. (Cl. 10—111)

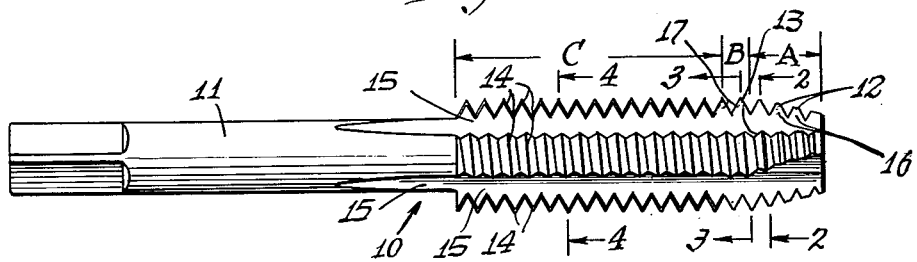
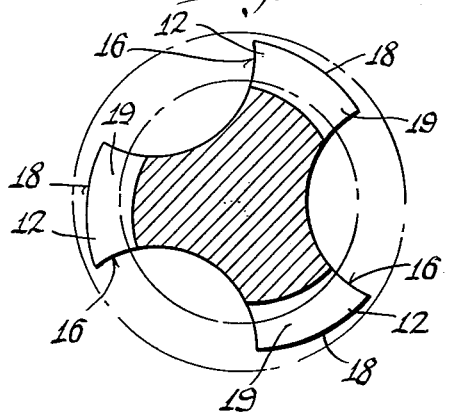
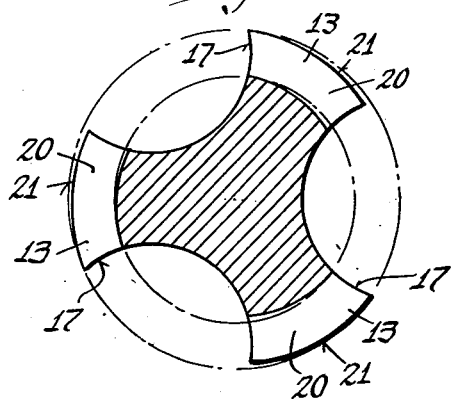
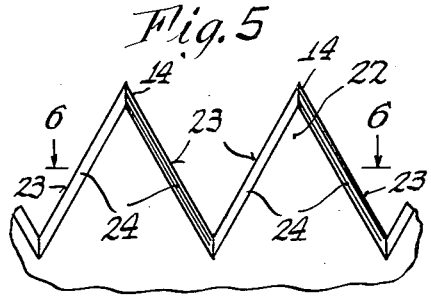
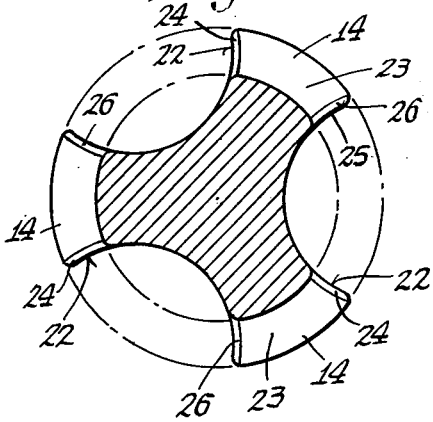
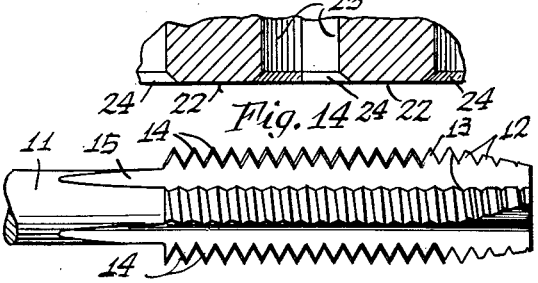

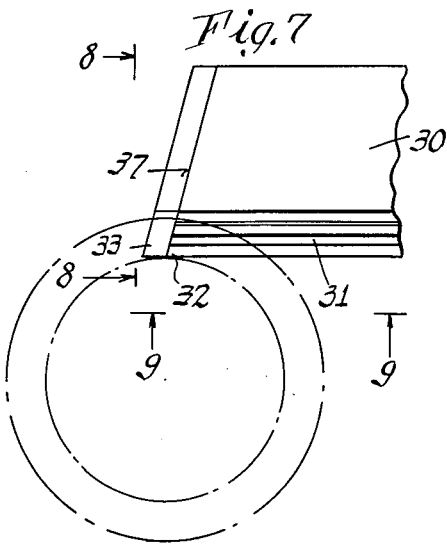
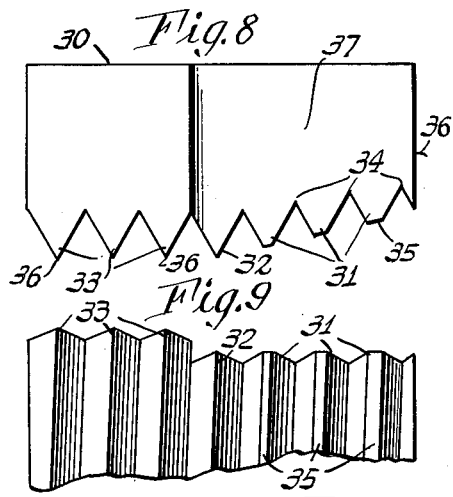
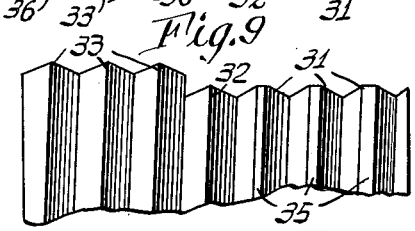
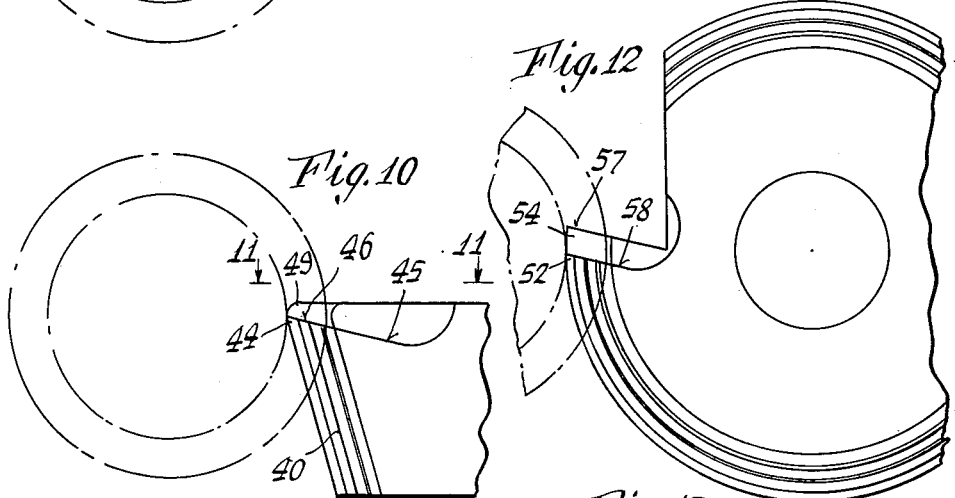
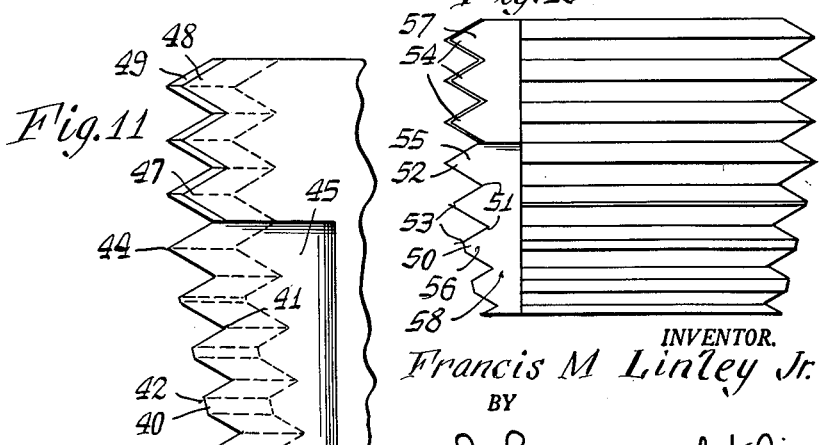
INVENTOR.
Francis M Linley Jr.
BY
Johnson and Kline
ATTORNEYS United States Patent Office 3,021,538
Patented Feb. 20, 1962

This invention relates to thread cutting tools.

In some classes of work, such as scientific and other instruments, it is required that screws and screw-threaded holes be very accurately made in both fit and form. This requirement has been difficult and expensive to meet with thread-cutting tools and equipment heretofore available. In fact, it has been impossible to obtain the desired accuracy with known threading tools and equipment used in mass production operations. One of the difficulties has been that, with known thread cutters such as taps and chasers, the slightest eccentricity of the spindle or chuck carrying the tap or screw blank, or wobble attendant upon necessary tolerances, resulted in excessive or insufficient cutting of portions of the thread by the guide teeth of the tool which act as a lead screw in causing or controlling the relative advancing movement between the threading tool and the work.

As used herein the term "guide teeth" shall mean those teeth or tooth formations provided on a thread cutting tool which act as a lead screw to cause or control the relative movement of the thread cutting tool and work along the axis of the cut thread, and the term should not be confused with leading or starting teeth.

Another problem in a thread cutting tool is that the longitudinal force required to advance the cutter for the rough cutting and finish cutting operations, which are performed by the first few teeth of the thread cutter, results in, or is the result of, contact between the flanks of the guide teeth of the tool and the flanks of the cut thread under substantial pressure. Hence, the edges formed between the face and flanks of a guide tooth tend to cut or rather shave the flanks of the cut threads and this results in what is termed a bell-mouth thread which is not desirable and in many cases unusable.

In the case of a tap in which the guide teeth having their tops and flanks relieved, that is, sloped away from the cutting face, only the portions adjacent the faces have contact with the cut threads and the chances of malforming the threads are great in thread-cutting direction of movement of the tap.

It is most desirable, in precision thread-cutting, to have the guide teeth unrelieved, since in this way the entire surface of the flanks of each guide tooth can engage the cut thread in the work and these teeth can form in the aggregate large cooperating bearing surfaces. It would seem that this would reduce the chances of malforming the threads in the work. However, when this is done, the danger of cutting the threads unintentionally is present, not only in the advancing movement of the tap but also in the retracting movement because both the heel and the face of each tooth will cut the flanks of the thread.

These difficulties are obviated by the present invention by providing a thread-cutting tool having at its forward end roughing teeth which have their tops and flanks relieved, followed by finishing teeth also having their tops and flanks relieved but having the cutting faces formed to the size and shape of the thread to be cut, and, following the finishing teeth guide teeth of substantially the same size and shape as the finishing teeth, but having no edges capable of cutting the work. The guide teeth so formed are therefore incapable of malforming the cut threads and yet they form an adequate bearing to guide the tap and accurately control the rate of relative advance of tool and work.

This may be accomplished, according to one form of the present invention, by chamfering the edges formed by the cutting profile or face of each guide tooth and the flanks and top of the tooth, the chamfering being sufficient to dull the edges so that they will not cut the work. In the case of chasers in which the trailing edge of the tooth does not engage the work or the chaser is bodily withdrawn from the work and not run out, as with a tap, only the faces of the guide teeth need be rendered noncutting. But, in the case of a tap, it is preferable to also chamfer the heel of each guide tooth to avoid the cutting of the work thereby, when the rotation of the tap or work is reversed and the tap is screwed out of the work.

The chamfering of the flanks of the guide teeth avoids cutting or shaving either as the result of the feeding engagement of the guide teeth and cut threads or the presence of eccentricity or wobble between the work and the tool.

In applying the present invention to certain forms of chasers, the guide teeth may be rendered noncutting by positioning them out of cutting contact with the work.

Depending upon the material being worked upon and the results desired, the pitch diameter of the guide teeth may be the same as that of the finishing teeth or slightly less. If the material has the property of cold-flowing away from the cutting edges of the finishing teeth and resiliently recovering to such an extent that excessive pressure would be produced between the threads and the guide teeth of the thread cutter, the pitch diameter of the guide teeth may advantageously be sufficiently less than that of the finishing teeth to avoid such excessive pressure. The pitch diameter of the guide teeth may be the same or slightly greater than that of the finishing teeth so that if desired, and the material of the work permits, the guide teeth may serve to burnish the surfaces of the threads cut by the roughing and finishing teeth.

According to the present invention the effort required to advance the thread cutter to cut threads may be substantially reduced because the roughing teeth can now have an optimum amount of relief for correct free cutting action on a particular material. This is not possible with a conventional thread cutter because, in the absence of noncutting guide teeth, the excessive relief of a free cutting cutter would not properly cut to size or duplicate a size.

The effort required to advance the thread cutter through the work may be reduced and the smoothness of the cut greatly improved by so providing the roughing teeth that the pitch diameter decreases forwardly from the finishing teeth to the front end of the tool. By so doing, the tops of the roughing teeth are much narrower than when the pitch diameter is constant and the outside diameter is reduced by merely grinding off the tops of the teeth as is common practice. By having their tops narrow, the flanks of the roughing teeth perform the major portion of the work of removing the material but they do it mostly by shaving rather than by gouging. This increases the axial thrust effect on the guide teeth, and if the latter were capable of cutting or shaving the cut thread, a bell-mouth thread would result. According to the present invention, however, the guide teeth do not cut or shave, and the advantages obtained from the use of a cutter having roughing teeth of gradually reduced pitch diameter may be obtained without the danger of producing bell-mouth threads.

One of the important advantages of the present invention is that it is now possible to produce a precision screw thread with a single tap having both roughing and finishing teeth.

Other features and advantages will hereinafter appear. In the accompanying drawings:

FIGURE 1 shows in elevation a tap made according to the present invention which includes both the noncutting guide teeth and the reduced pitch roughing teeth.

FIG. 2 is a section taken on the line 2—2 of FIG. 1.

FIG. 3 is a section taken on the line 3—3 of FIG. 1.

FIG. 4 is a section taken on the line 4—4 of FIG. 1

FIG. 5 shows in elevation several of the guide teeth shown in FIG. 1 but greatly enlarged.

FIG. 6 is a section taken on the line 6—6 of FIG. 5.

FIG. 7 shows in elevation the forward end of a chaser made according to the present invention.

FIG. 8 is an end view of the chaser shown in FIG. 7, looking in the direction of the arrows 8—8 of FIG. 7.

FIG. 9 is a plan view of the chaser shown in FIG. 7, looking in the direction of the arrows 9—9 of FIG. 7.

FIG. 10 shows in elevation another form of chaser made according to the present invention.

FIG. 11 is a plan view of the chaser shown in FIG. 10, looking in the direction of the arrows 11—11 of FIG. 10.

FIG. 12 is an elevation of a circular chaser made according to the present invention.

FIG. 13 is a plan view of the chaser shown in FIG. 12.

FIG. 14 is a view similar to FIG. 1 but showing a tap made according to the present invention but having the pitch diameter of the roughing teeth the same as that of the finishing teeth.

As pointed out above, the present invention is applicable in many of its aspects to taps, chasers and other forms of thread-cutting tools.

Referring first to the application of the present invention to a tap, in FIG. 1 there is shown a tap 10 having a shank 11 at one end to be received by a chuck or other holder, and at the other end cutting teeth. According to the present invention, the cutting teeth are divided into three groups. Group A at the forward end of the tap includes roughing teeth 12 which are followed by group B which includes finishing teeth 13 and these are followed by group C which includes guide teeth 14. As usual, the tap is provided with longitudinal flutes 15, straight or helical, through which chips formed in the threading operation may escape from the hole being threaded. The flutes 15 are usually formed by a grinding operation so that the faces 16 of the roughing teeth 12 and the faces 17 of the finishing teeth 13 have sharp cutting edges to cut into and remove material to form the thread in the work.

The roughing teeth have their apexes ground off to form tops 18 on a gradually reducing diameter from the finishing teeth 13 to the adjacent end of the tap so that the removal of material is gradual as the tap proceeds through the work.

In the broader aspects of the invention, the pitch diameter of the roughing teeth 12 may be the same as the pitch diameter of the finishing teeth 13, as shown in FIG. 14. However, when this is done, the action of the roughing teeth on the work is substantially a gouging action and the cutting is accordingly comparatively rough and requires considerable effort.

It is considered preferable in some situations to avoid this, and hence, as shown in FIG. 1, the pitch diameter of the roughing teeth 12 may be decreased gradually from the finishing teeth 13 toward the adjacent end of the tap. As a result, a substantial part of the cutting action of the roughing teeth will be a shaving action performed by the edges formed by the faces 16 and the flanks of the teeth 12. While these make a smooth cut, there are axial thrusts applied to the tap and this would increase the tendency of the finishing teeth 13 and the guide teeth 14 to also shave the sides of the threads and produce what is known as a bell-mouth thread. As will be pointed out below, by making the guide teeth 14 noncutting, the disadvantage of having the roughing teeth 12 of decreasing pitch diameter is avoided, while the advantages are retained.

In addition to having their apexes ground off, the roughing teeth 12 have their tops 18 and flanks 19 relieved away from their faces 16 to facilitate the cutting of the work material. Likewise, but usually not to such a great extent, the finishing teeth 13 have their flanks 20 and tops 21 relieved rearwardly of their faces 17 as shown in FIG. 3.

In many taps, the teeth from the first full diameter tooth to the shank end of the tap are guide teeth which act as a lead screw to control the relative axial advancement of the tap into the work, and have their teeth relieved away from the cutting faces. In other forms of taps, the guide teeth are not so relieved. Even though the guide teeth are not relieved, they have a tendency to and frequently do shave the cut thread in passing through it both in work-performing and tap-withdrawing operations, and it is therefore impossible with consistency to obtain a precision-formed thread, especially when it is desired to operate the tap by machinery as in mass production work.

This disadvantage has been overcome by the present invention by rendering the guide teeth 14 noncutting and this is accomplished, as shown in FIGS. 1, 4, 5, 6 and 14 by rounding-off or chamfering the edges of each guide tooth formed by the face 22 and the flanks 23 so as to produce noncutting surfaces 24 on the face portions of the teeth.

Within the scope of the present invention, the amount of chamfering performed on each tooth may be varied within wide limits, but it is desirable to limit it to an amount which is merely sufficient to render the tooth noncutting, leaving practically the entire surface of the flanks 23 of the teeth to have bearing contact with the cut thread and thus more accurately guide and control the advancing movements of the tap through the work.

In some situations, it may be sufficient to chamfer merely the faces 22 of the guide teeth 14, but usually it is more advantageous to also chamfer the edges formed between the flanks 23 of the teeth 14 and the heels 25 of the teeth so as to provide a noncutting surface 26 as shown in FIG. 4. In this way, the cutting of the thread by the guide teeth is avoided both while the tap is entering the work and also while it is being rotated in the opposite direction to withdraw it from the work after the threading operation is completed.

The chamfering of the guide teeth 14 may be performed in any desired manner. However, it has been found advantageous when grinding the guide teeth to shift the grinding wheel so that as it enters and leaves each tooth it will grind off the edges which would otherwise be left as cutting edges.

The problem of controlling the relative advancing movement between the work and the thread-cutting tool without malforming the cut thread is also present when providing external threads on a piece of work with the use of chasers, and the present invention is applicable to such tools. For instance, as shown in FIGS. 7, 8 and 9, a chaser body 30 has at its working end roughing teeth 31, a finishing tooth 32 and guide teeth 33. The roughing teeth 31 may have their roots in the same plane as those of the finishing and guide teeth, or they may have their roots 34 on a line converging toward the work and their tops 35 ground off in increasing amounts from the finishing tooth 32 to the side 36 of the chaser as shown in FIG. 8. Thus, as in the case of the tap disclosed in FIG. 1, a substantial part of the cutting action of the roughing teeth is one of shaving rather than gouging. The finishing tooth 32 is full thread shape.

To render the guide teeth 33 noncutting, where the chaser is tangential to the work as in FIGS. 7, 8 and 9, the present invention extends the guide teeth 33 forwardly beyond the line of contact of the roughing and finishing teeth with the work so that the leading edges or tops 36 of the guide teeth do not engage the flanks of the cut thread and have no opportunity to shave or gouge the cut thread. Since the portion of the chaser carrying the guide teeth 33 does no cutting and does not need to be ground, only the portion 37 of the chaser which contains the finishing tooth 32 and roughing teeth 31 need be ground down to produce cutting edges.

In the case of a chaser which approaches the work radially as shown in FIG. 10, the cutting teeth are formed somewhat differently. Here, again, the roughing teeth 40 may have their roots 41 located on a line converging toward the work from the edge of the chaser inwardly. They also have their tops 42 ground as in the chaser shown in FIG. 8.

In addition, the top portion of the chaser in the vicinity of the roughing teeth 40 and the finishing teeth 44 is ground away at 45 to provide sharp cutting edges on the faces 46 of the roughing and finishing teeth. The portion of the chaser carrying the guide teeth 47 which extend beyond the roughing and finishing teeth is left whole except that the faces 48 of the guide teeth are chamfered so as to provide noncutting surfaces 49.

In the case of a circular chaser such as the chaser shown in FIGS. 12 and 13, it is not necessary to chamfer the leading edges of the guide teeth. Instead, as in the embodiment of the invention illustrated in FIG. 7, the guide teeth according to the present invention are extended beyond the cutting plane and therefore their leading edges do not contact the work.

Referring to FIGS. 12 and 13 the roughing teeth 50 may have their roots 51 on a line converging from the end of the chaser to the finishing tooth 52 and the tops 53 of the roughing teeth are ground off as in the chaser shown in FIGS. 10 and 11. Beyond the finishing tooth 52, the chaser shown in FIGS. 12 and 13 has guide teeth 54, the leading edges of which are arcuately in advance of the cutting faces 55 and 56 of the finishing and roughing teeth respectively as shown in FIG. 11. Therefore, the faces 57 of the guide teeth 54 do not have any cutting contact with the work, and as a result do not malform the cut thread.

In servicing the circular chaser shown in FIGS. 12 and 13, it is merely necessary to grind the surface 58 adjacent the roughing and finishing teeth and readjust the chaser in order to sharpen the cutting edges formed by the faces and flanks of the roughing and finishing teeth. When this is done, the leading edges of the guide teeth 54 will be still farther advanced relative to the cutting surfaces of the roughing and finishing teeth. As a matter of fact, the guide teeth 54 may be formed as continuous annuli.

However, to provide a sufficiently large space for chip clearance, it may be found preferable in many situations not only to grind off the leading edges of the roughing and finishing teeth but also, although not to the same extent, the leading surface of the guide teeth 54.

From the above, it will be seen that the guide teeth of the thread cutting tool may be rendered noncutting either by chamfering the surfaces which would otherwise cut as in FIGS. 1, 4, 5, 6 and 14, or by positioning the leading surfaces of the guide teeth so that they will not cut as in FIGS. 7, 8, 9, 11 and 13, or by a combination of chamfering and positioning as shown in FIGS. 10 and 11.

If desired and depending upon the material employed, the guide teeth of the cutting tools of the present invention many have a slightly different diameter or position from the cutting teeth. For instance, if the work is of a kind which cold flows and therefore permits the material to reform slightly after the finishing tooth passes, the guide teeth may be positioned a little farther away from the work than the finishing tooth.

In the case of a tap, the guide teeth may have a slightly smaller pitch diameter than the finishing teeth. In other cases, it might be desirable to cause the guide teeth to burnish the sides of the cut threads and in such situations the guide threads may be closer to the work than the finishing teeth.

In the case of a tap, if it is desired to have the guide teeth burnish the work, the pitch diameter of the guide teeth would be slightly greater than that of the cutting teeth.

Variations and modification may be made within the scope of the claims and portions of the improvements may be used without others.

I claim:

1. A thread cutting tool having roughing teeth followed by at least one finishing tooth followed by guide teeth with each of said teeth having a leading face with the leading faces of the roughing and finishing teeth being cutting faces; the leading face of each guide tooth being no larger than the leading face of the finishing tooth; the edges of each guide tooth formed by the intersection of the leading face and the flanks of the tooth being dulled to render the leading faces of the guide teeth non-cutting.

2. A thread cutting tool having roughing teeth followed by at least one finishing tooth followed by guide teeth with each of said teeth having a leading face and a heel face with the leading faces of the roughing and finishing teeth being cutting faces; the leading face of each guide tooth being no larger than the leading face of the finishing tooth; the edges of each guide tooth formed by the intersection of the leading face and the flanks of the tooth being dulled to render the cutting faces of the guide teeth non-cutting and the edges of each guide tooth formed by the intersection of the heel face and the flanks of the tooth being dulled to render the heels non-cutting when the tool is reversely moved.

3. A thread cutting tool having roughing teeth followed by at least one finishing tooth followed by guide teeth with each of said teeth having a cutting face; the roughing teeth and the finishing tooth each having their crests relieved rearwardly from the cutting face; each tooth of the roughing teeth and finishing tooth having both flanks relieved backwardly from the cutting face; and each guide tooth constituting a full thread section by having their flanks unrelieved and the crest of each guide tooth constituting an arc of a circle by having its crest unrelieved; each of said teeth having a leading face and a heel face with the leading faces of the roughing and finishing teeth being cutting faces; the leading face of each guide tooth being substantially identical with the leading face of the finishing tooth; the edges of each guide tooth formed by the intersection of the leading face and the flanks of the tooth being dulled to render the cutting faces of the guide teeth non-cutting and the edges of each guide tooth formed by the intersection of the heel face and the flanks of the tooth being dulled to render the heels non-cutting when the tool is reversely moved.

References Cited in the file of this patent

UNITED STATES PATENTS

| | | |
|---|---|---|
| 1,252,525 | Woodward | Jan. 8, 1918 |
| 1,365,338 | Muth | Jan. 11, 1921 |
| 1,748,962 | Smith | Mar. 4, 1930 |
| 1,845,063 | Trbojevich | Feb. 16, 1932 |
| 1,874,378 | Steinruck | Aug. 30, 1932 |
| 1,881,281 | Lamond | Oct. 4, 1932 |
| 1,912,517 | De Lapotterie | June 26, 1933 |
| 1,936,696 | Thomson | Nov. 28, 1933 |
| 1,953,528 | Bysshe | Apr. 3, 1934 |
| 2,556,174 | Evans | June 12, 1951 |
| 2,744,269 | Kerr | May 8, 1956 |
| 2,816,302 | Bauer | Dec. 17, 1957 |

FOREIGN PATENTS

| | | |
|---|---|---|
| 415,691 | France | Oct. 1, 1910 |
| 449,415 | Germany | Sept. 17, 1927 |